LONG DISTANCE COMMUNICATION SYSTEM

Filed Sept. 7, 1956

4 Sheets-Sheet 1

INVENTOR
HENRI G. BUSIGNIES
BY Alfred C. Hill
AGENT

INVENTOR
HENRI G. BUSIGNIES
BY Alfred C. Hill
AGENT

Jan. 27, 1959 H. G. BUSIGNIES 2,871,344

LONG DISTANCE COMMUNICATION SYSTEM

Filed Sept. 7, 1956 4 Sheets-Sheet 3

INVENTOR
HENRI G. BUSIGNIES
BY Alfred C. Hill
AGENT

INVENTOR
HENRI G. BUSIGNIES
BY Alfred C. Hill
AGENT 2,871,344

LONG DISTANCE COMMUNICATION SYSTEM

Henri G. Busignies, Montclair, N. J., assignor to International Telephone and Telegraph Corporation, Nutley, N. J., a corporation of Maryland Application September 7, 1956, Serial No. 608,530

7 Claims. (Cl. 250—15)

Figure 1:
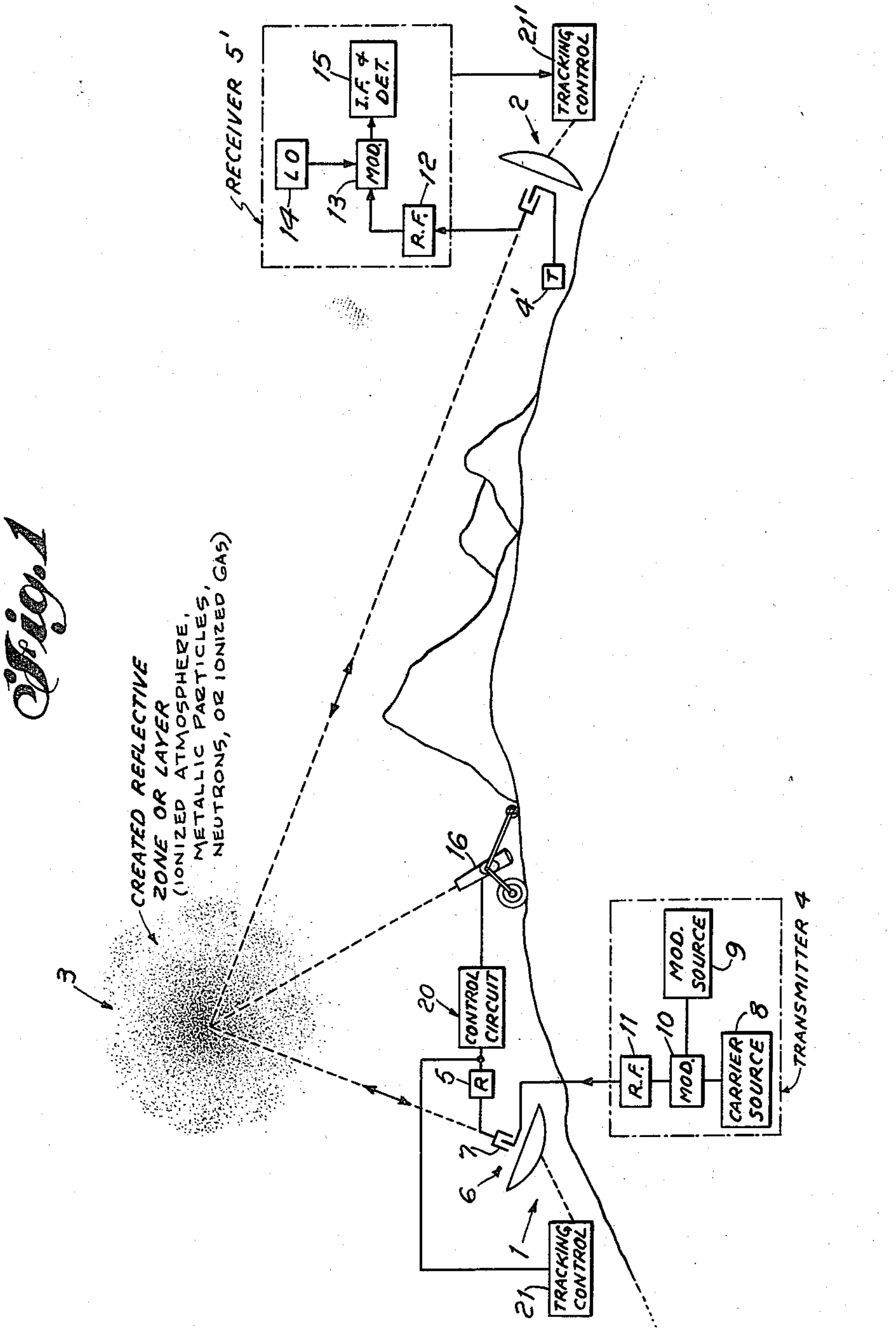

This invention relates to communication systems and more particularly to a long distance communication system of the beyond-the-horizon type.

In recent years, the subject of radio propagation by scattering processes has become of great theoretical and practical importance. The discoveries that V. H. F., U. H. F., and S. H. F. signals are propagated to distances well beyond the horizon with losses much less than are predicted by diffraction theory and with high reliability have made possible the design of reliable point-to-point communication systems to operate over distances of 200 miles or more beyond the horizon. These systems employ high gain antennas, high power transmitters and space diversity reception. The cost of such equipment is justified in many applications because the need for intermediate repeater stations is obviated.

There are two different types of beyond-the-horizon or forward scatter transmission. One type is the ionospheric scatter which is useful for telegraph signals at frequencies below about 50 megacycles for distances up to a thousand miles or more. The second type is tropospheric transmission which is useful over a very wide band of frequencies in the order of 300 to 5,000 megacycles, but is limited in distance to a few hundred miles. In each type of beyond-the-horizon transmission, the reflective scattering of the electromagnetic wave depends upon the reflective characteristics of a natural layer of electrified particles found in the upper atmosphere. As is known, the characteristics of these layers vary and, hence, communication utilizing such layers tends to be erratic. Also, the signal-to-noise ratio of the over-all communication system may vary and generally the ratio is lower than desirable even though communication is possible.

It is an object of this invention to provide a relatively stable point-to-point communication system of the beyond-the-horizon type.

Another object of this invention is to provide a point-to-point communication system of the beyond-the-horizon type having an improved signal-to-noise ratio with respect to the signal-to-noise ratio now obtainable in present beyond-the-horizon communication systems.

Still another object of this invention is to provide a controllable artificial layer in the upper atmosphere to reflectively scatter intelligence-bearing electromagnetic waves and thereby enhance stability and signal-to-noise ratio of a beyond-the-horizon communication system.

A feature of this invention is the creation of an artificial layer of electromagnetic wave reflective scattering material in a given zone of the upper atmosphere. An electromagnetic wave beam from a transmitter incident on said artificial layer at a given angle is caused to be reflectively scattered earthward toward a receiver spaced from said transmitter and adapted to receive the scattered electromagnetic energy of the beam.

In accordance with other features of the present invention the electromagnetic wave reflective scattering layer or cloud is created by the reaction of nitric oxide with the atomic oxygen of the atmosphere, by the presence of neutrons, by the scattering of fine metal particles, by the release of ionized gas and/or by the combination of various ones of such means.

Still other features of this invention include as means to disperse the above reflective scattering materials in the desired zone of the upper atmosphere radiation means, projecting means including guns and the like, aircraft including guided missiles, balloons, rockets and the like, and the expelling of an ionized gas in the exhaust of aircraft, such as rockets.

Figure 2:
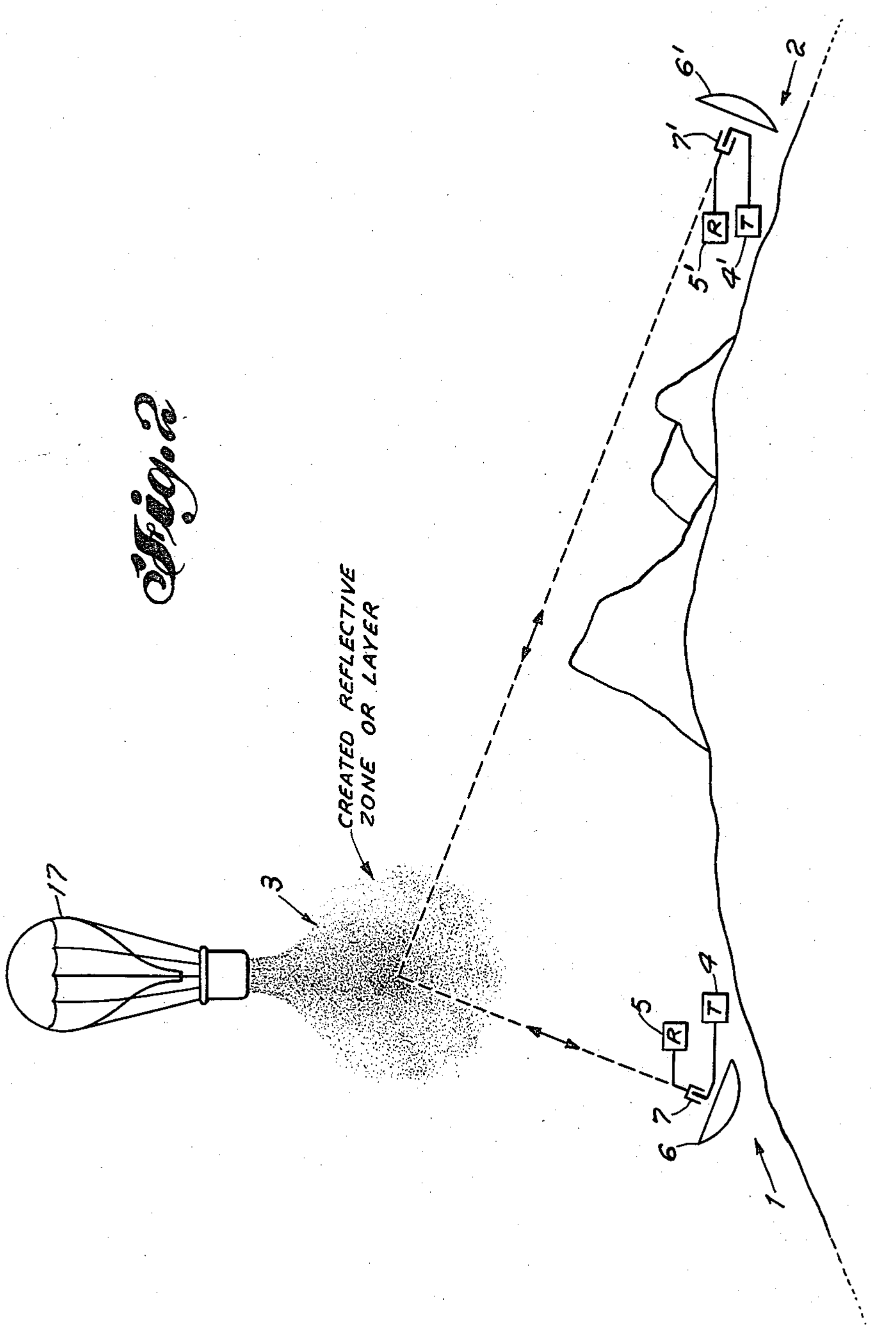
Figure 3:
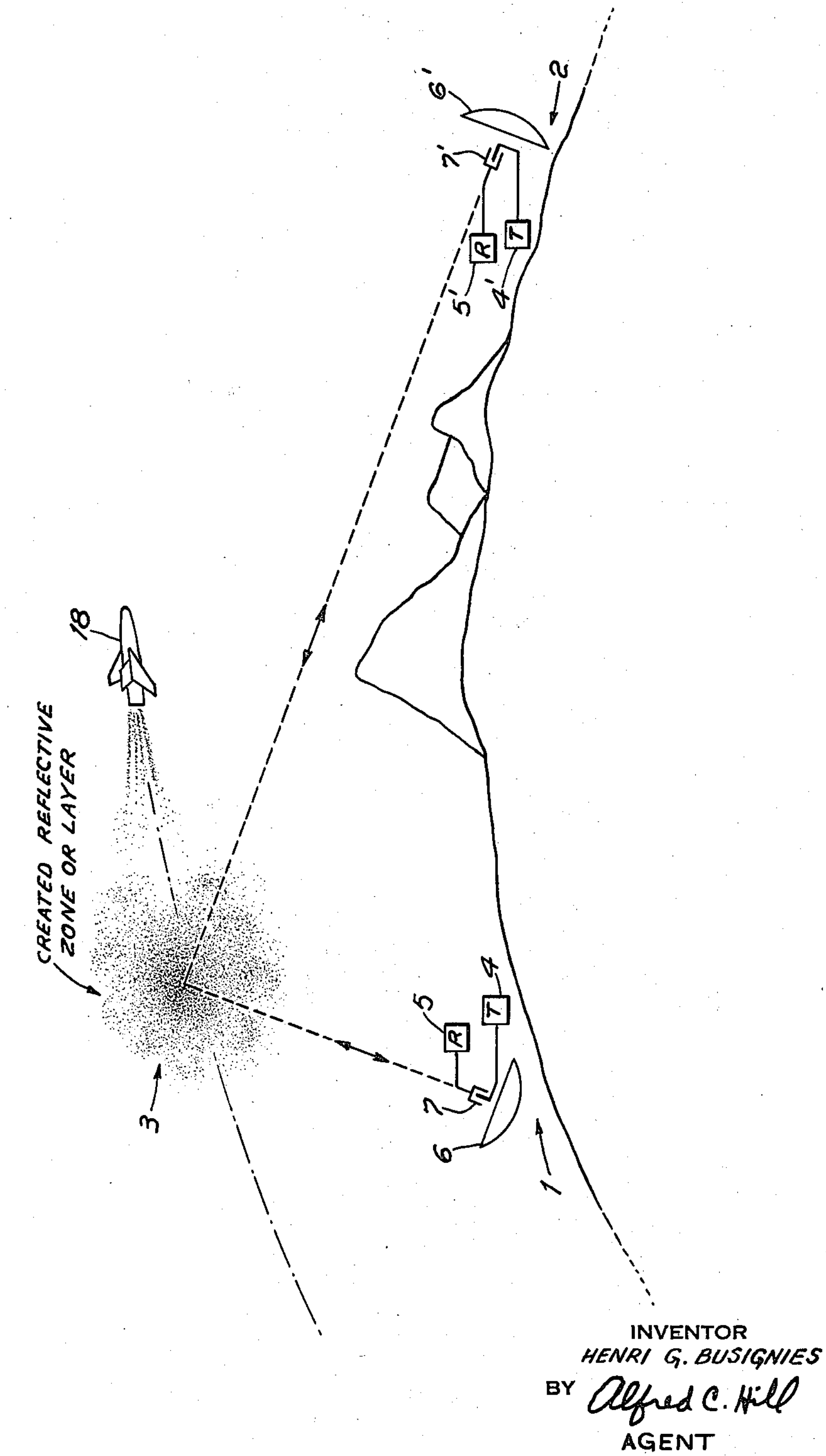
Figure 4:
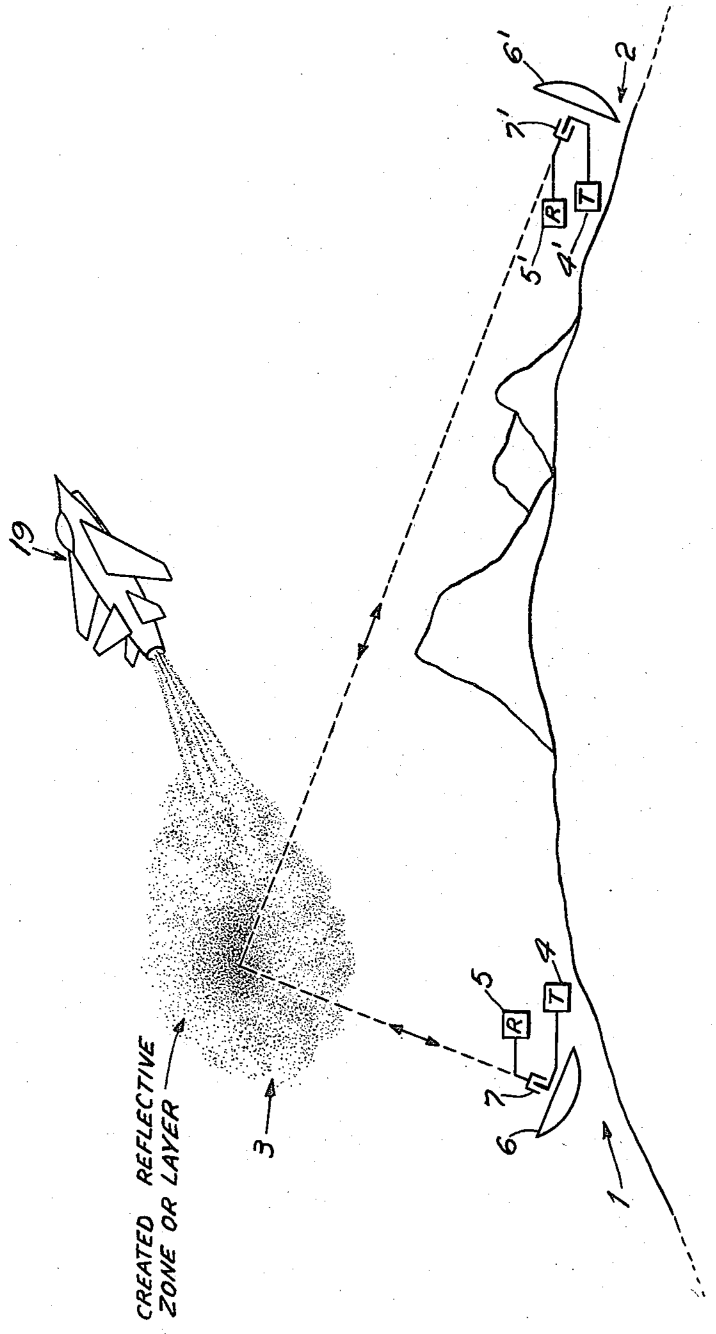

The above-mentioned and other features and objects of this invention will become more apparent by reference to the following description taken in conjunction with the accompanying drawings, in which:

Fig. 1 illustrates schematically a communication system following the principles of this invention including therein an embodiment of means to create a reflective scattering layer in the upper atmosphere; and Figs. 2, 3 and 4 illustrate schematically alternative embodiments of means for creating a reflective scattering layer in the communication system of Fig. 1.

Figs. 1, 2, 3 and 4 illustrate a communication system following the principles of this invention, as comprising a terminal 1 disposed at a first point and a terminal 2 disposed at a second point spaced from said first point, said spacing preferably being beyond the horizon with respect to said first point. Point-to-point communication is provided between terminals 1 and 2 by creating in zone 3 a layer or cloud of reflective scattering material. Zone 3 is disposed in a predetermined area of the upper atmosphere and may be positioned at any selected point therein intermediate terminals 1 and 2. The term "upper atmosphere" as employed in the specification and claims of the present application generally refers to the atmosphere in the vicinity of the tropospheric and the ionospheric layers. It has been discovered that the greatest signal-to-noise ratio improvement, in the order of 20 db, over conventional beyond-the-horizon communication systems is provided when the reflective scattering zone 3 is positioned adjacent either one of the terminals, illustrated in the figures of the drawing to be terminal 1.

Terminals 1 and 2 include respecting transmitters, 4 and 4′, and receivers 5 and 5′, and antennas 6 and 6′. The transmitters 4 and 4′ and the receivers 5 and 5′ are respectively coupled to antennas 6 and 6′ to provide both transmission and reception on the same antenna by employing any well-known diplexer arrangement illustrated schematically at 7 and 7′. Antennas 6 and 6′ are preferably directioned and are positioned such that an electromagnetic wave beam propagated from one of the antennas would be directed toward zone 3 at a predetermined angle such that energy of the beam would be reflectively scattered earthward for reception at the other of the antennas. By using directional antennas aimed at the reflective zone maximum use is made of its property.

The transmitters of each of the terminals include as illustrated at terminal 1 a carrier frequency source 8, a modulation source 9 and a modulator 10 which coact to provide an intelligence bearing carrier frequency signal. The modulated carrier frequency signal is coupled to a radio frequency amplifier 11 and, thence, to antenna 6 which beams the intelligence-bearing carrier signal in the form of electromagnetic waves toward the reflective scattering zone 3. Energy of the modulated carrier is reflectively scattered toward terminal 2, certain portions of the energy being received by antenna 6′. The output from antenna 6′ is then coupled to receiver 5′ which includes a radio frequency amplifier 12 whose output is coupled to a mixer 13 for mixing with a local oscillator frequency 14 to produce the desired intermediate frequency signal. This intermediate frequency signal may be coupled to intermediate frequency amplifiers and, hence, to a detector for demodulation of the scattered intelligence-bearing electromagnetic wave. The intermediate frequency amplification and demodulation would take place in equipment designated by block 15 in receiver 5'. Each of the receivers and transmitters may be similar including substantially the same detailed circuitry illustrated in Fig. 1.

There are several materials that may be dispersed in zone 3 to render it reflectively scattering for electromagnetic waves to enable reception thereof at a point spaced beyond the horizon form the point at which the electromagnetic wave was originally directed toward zone 3. These materials include metallic chaff, preferably in the form of fine metal particles or foil of, for example, aluminum, copper, and the like. Another material that will accomplish the desired reflective scattering is neutrons which may be radiated in the form of a beam into the reflecting zone from which electromagnetic waves incident thereon will be reflectively scattered earthward toward the receiving point. Another material that may be employed to provide the desired reflective scattering is ionized gas, such as carbon tetrachloride, carbon tetrafluoride, or sulfa hexafluoride. Still a further material to provide the reflective scattering zone utilized nitric oxide as a catalyst to provide clouds of ionized atmosphere from which electromagnetic waves will be reflectively scattered. It has been known for some time that sunlight striking the atmosphere at approximately 60 miles above the earth breaks two-atom oxygen molecules ($O_2$) into single oxygen atoms. Normally the single atoms recombine when they come into contact with nitric oxide as a catalyst. Since there is only a tiny trace of this gas in the high atmosphere, they recombine slowly releasing enough energy in the process to produce a hardly perceptible glow in the night sky. It has been discovered that small additions of nitric oxide can quickly unlock the stored energy in atomized oxygen. It is not certain how much energy is stored in the layer of atomic oxygen, but since the supply is renewed everyday by the sunlight, it should be inexhaustible. When nitric oxide is released in daytime, it is acted upon by sunlight and forms a dense cloud of electrified particles that reflectively scatter radio waves. The nitric oxide gas is effective as long as it is sufficiently concentrated. It is not consumed by the reaction that it triggers.

Referring to Fig. 1, a device 16 is illustrated for projecting any of the materials outlined hereinabove into zone 3 to provide the desired reflective scattering of electromagnetic waves therefrom. Metallic chaff may be projected into zone 3 by employing a properly timed fused bomb-type device which can be projected from device 16 into zone 3 in which the bomb will explode and release the metallic chaff. Device 16 may be a radiation device which will radiate a beam of neutrons into zone 3 in such a manner as to provide the desired reflective scattering layer. Device 16 may further be a type of gun employed to project into zone 3 a bomb-type structure containing an ionized gas which gas is released to provide the desired reflective scattering layer. Likewise, device 16 may project nitric oxide into zone 3 which acts to ionize the atmosphere itself to provide the reflective scattering layer.

Referring to Fig. 2, there is illustrated an aircraft 17 preferably of the lighter-than-air type from which metallic particles, radiated neutrons, ionized gas, and nitric oxide can be dispensed into zone 3 to provide in their individual manners as outline hereinabove the desired reflective scattering zone.

Fig. 3 illustrates still another device for dispensing the materials outlined hereinabove into zone 3. The dispensing device is illustrated as a missile-type aircraft 18 from which any of the materials set forth hereinabove may be dispensed.

Fig. 4 illustrates as the device for dispensing an ionized gas into zone 3, a rocket or jet-type aircraft 19. The ionized gas is expelled from the exhaust of aircraft 17 establishes in zone 3 an ionized body of gas which will provide the desired reflective scattering.

In connection with each of the means to dispense the material into zone 3, there should be provided an arrangement to replenish the reflective scattering material to maintain as high as possible the improved signal-to-noise ratio. As illustrated in Fig. 1, control circuit 20 could be employed to provide the desired control to cause device 16 to project the material into zone 3 when control circuit 20 recognizes that the signal-to-noise ratio is diminishing due to the dissipation of the reflective scattering material. In the case of the balloon dispensing arrangement of Fig. 2, separate radio communication could be had with balloon 17 to trigger the releasing arrangement thereof to replenish the reflective scattering material of zone 3. In the case of Figs. 3 and 4, through remote control it would be possible to have the aircraft illustrated successively pass through zone 3 and release the material therein to replenish reflective scattering material as the material diminishes to a point below which the signal-to-noise ratio becomes unacceptable.

A tracking control 21 is provided in conjunction with antenna 6 to track the reflective scattering zone as it drifts to maintain a desired signal-to-noise ratio. The tracking arrangement is actuated by an arrangement monitoring the signal-to-noise ratio of the received signal and causing the antenna orientation to change when this ratio falls below a desired point. The motion of the antenna orientation may be arranged to scan over a given area in any pattern and this movement ceases when the signl-to-noise ratio is satisfactory. Similar tracking control 21' is provided for antenna 6'. It will be obvious that the above arrangement also assures that during transmission the radiated beam is also maintained directly at the reflecting layer.

While I have described above the principles of my invention in connection with specific apparatus, it is to be clearly understood that this description is made only by way of example and not as a limitation to the scope of my invention as set forth in the objects thereof and in the accompanying claims.

I claim:

1. An over-the-horizon communication system between two spaced points comprising a transmitter and receiver at each of said points, a directive antenna system at each of said points coupled to said transmitter and said receiver, means to deposit in a given zone of the upper atmosphere a layer of electromagnetic wave dispersive material, means for directing the antenna system at each of said points toward said layer and means coupled to the receiver at one of said points and responsive to a change in the characteristic of the received signal to replenish said material in said layer to maintain its electromagnetic wave dispersive properties.

2. An antenna according to claim 1, wherein said reflective material includes neutrons and said means to deposit includes means to radiate a beam of neutrons into said zone.

3. A system according to claim 1, wherein said reflective material includes fine metal particles and said means to deposit includes an aircraft.

4. A system according to claim 1, wherein said reflective material includes a body of ionized gas and said means to deposit includes the exhaust of aircraft of the rocket type.

5. A system according to claim 1, wherein said reflective material includes ionized particles of the atmosphere and said means to deposit includes means to project nitric oxide into said given zone for reaction therein with single oxygen atoms to produce the ionized particles.

6. An over-the-horizon communication system between two spaced points comprising a transmitter and receiver at each of said points, a directive antenna system at each of said points coupled to said transmitter and said receiver, means to deposit in a given zone of the upper atmosphere a layer of electromagnetic wave dispersive reflective material, means for directing the antenna system at each of said points toward said layer, tracking means at each of said points coupled to its receiver and responsive to a change in a characteristic of the received signal for causing the associate antenna system to track said layer, and means coupled to the receiver at one of said points and responsive to a change in a characteristic of the receiver signal to replenish said material in said layer to maintain its electromagnetic wave dispersive properties.

7. An antenna according to claim 6, wherein said reflective material includes neutrons and said means to deposit includes means to radiate a beam of neutrons into said zone.

References Cited in the file of this patent

UNITED STATES PATENTS

| | | |
|---|---|---|
| 2,463,233 | Alexanderson | Mar. 1, 1940 |
| 2,542,823 | Lyle | Feb. 20, 1951 |
| 2,703,882 | Wilkes | Mar. 8, 1955 |

FOREIGN PATENTS

| | | |
|---|---|---|
| 191,406 | Great Britain | Feb. 8, 1923 |

OTHER REFERENCES

Article from London Daily Express, Feb. 24, 1944, under subhead "Flutterers" available in Div. 44.